Figure 1:
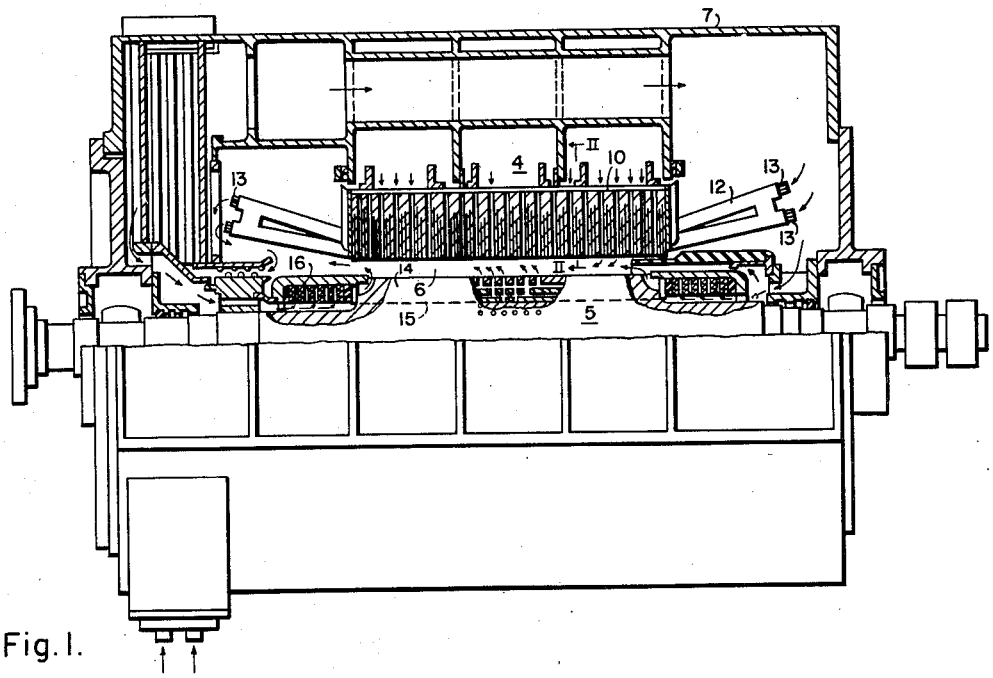

July 9, 1957     H. T. AKERS     2,798,975

CONDUCTOR-VENTILATED GENERATORS

Filed Nov. 23, 1954

WITNESSES

INVENTOR
Harry T. Akers
BY
ATTORNEY

United States Patent Office 2,798,975
Patented July 9, 1957

2,798,975
CONDUCTOR-VENTILATED GENERATORS

Harry T. Akers, Pittsburgh, Pa., assignor to Westinghouse Electric Corporation, East Pittsburgh, Pa., a corporation of Pennsylvania Application November 23, 1954, Serial No. 470,666

4 Claims. (Cl. 310—64)

My invention relates to conductor-ventilated synchronous generators, which are usually large high-voltage high-speed turbine-generators in which relatively lightly insulated conductors are directly cooled by the flow of a cooling medium in relatively good thermal contact with the conductors, in both the stator and rotor members. My present invention has particular relation to the stator winding of such a machine, in which lightly insulated transposed contactor-strands are directly cooled by one or more stacks of open-ended cooling-ducts which are disposed, with the strands, inside of a solid, continuous, major insulation sheathing which has the property of a dielectric barrier. The ducts are usually and preferably made of lightly insulated high-resistance metal, having sufficient mechanical strength to withstand the pressures which are usually employed in the application and compacting of the insulating sheathing, as set forth in an application of R. A. Baudry and P. R. Heller, Serial No. 248,852, filed September 28, 1951.

The rating of such a machine is dependent upon the hot-spot conductor-temperature of the stator-winding. Heretofore, as shown in the Baudry-Heller application, a single stack of cooling-ducts has been used, disposed between two groups of transposed conductor-strands, so that the massive insulation-sheathing came into contact with the outermost surfaces of the conductor-strands, thus limiting the permissible hot-spot conductor-temperature to the highest temperature which can be withstood by the insulating sheathing, which, for several reasons, is desirably, if not necessarily, Class B insulation, having a rating of 130° C. The central disposition of a single stack of ducts was previously adopted, because it was the most efficient disposition for the ducts, having the greatest effective heat-exchanging surface with respect to the space occupied by the ducts, so that a maximum total cross-sectional area of conductor-material could be used, in a given size of stator-slot. Since the hot-spot conductor-temperature was limited to substantially the same temperature-rating as the sheathing, in this old form of construction, the light individual strand-insulation was also of the same class, having the same temperature-rating as the sheathing.

My invention overcomes this hot-spot limitation by using a surrounding buffer-layer of stacked open-ended ventilating ducts, close against the four outer sides of the stranded-conductor assembly, so that the ducts act as a heat-buffer between the conductor-strands and the outer insulating sheathing. This disposition of the ducts takes more room, in the stator-slot, because it is not feasible to make the internal cross-sectional duct-area very much smaller than it was in the former construction, so that the total cross-sectional area of the stranded conductor has to be reduced, when using my invention, in a given available size of stator-slot. This handicap is much more than overcome, however, by using a high-temperature insulating-material for the low-voltage strand-insulation, so that the permissible hot-point conductor-temperature may be raised to any conveniently high temperature, as by using Class H strand-insulation, rated at 180° or 200° C., or even higher. This gives a very considerably increase in the permissible conductor-temperature, resulting in a substantial increase in the current-carrying rating of the stator-winding.

Figure 2:
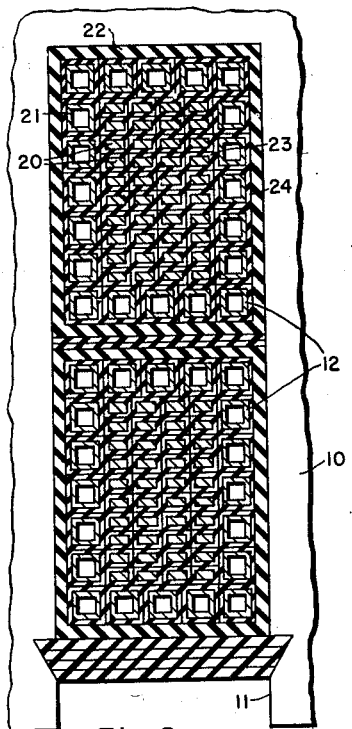

With the foregoing and other objects in view, my invention consists in the systems, structures, combinations, parts, and methods of design and operation, as hereinafter described, and illustrated in the accompanying drawing, wherein:

Fig. 1 is a side-elevational view, the top half being in longitudinal section, showing an illustrative hydrogen-cooled turbine-generator of a type to which my invention is applied, and Fig. 2 is a transverse sectional view through the stator-conductor winding-portions which lie within one of the stator-slots, the section-plane being indicated, for example, by the line II—II in Fig. 1.

Fig. 1 shows a turbine-generator, which is illustrative of a dynamo-electric machine having a cylindrical-bore stator member 4, and a cylindrical rotor member 5, separated by an air gap 6. The stator member 4 includes a substantially hermetically sealed or gas-tight housing 7 which encloses the stator and rotor members, and which is provided with a gaseous filling, which is preferably hydrogen at a gas-pressure which is adapted, at times, to be at least as high as 30 pounds per square inch, gauge, and which may be considerably higher than this pressure.

The stator member 4 comprises a cylindrical core 10 having a plurality of winding-receiving stator-slots 11. The stator member also comprises an alternating-current stator-winding 12, having coil-sides which are disposed within the slots 11, and coil-ends lying beyond the respective ends of the stator-core 10. The stator-winding 12 has a plurality of half-coil portions, each comprising one or more stacks of open-ended ventilating-ducts having duct-ends 13 which are illustrated, in Fig. 1, as extending out beyond the ends of the several half-coil portions of the stator-winding. These stator-ducts are used for substantially directly cooling the conductors which comprise the stator-winding 12, with a relatively good heat-exchange between the ducts and the winding.

The rotor member 5 comprises a cylindrical rotor-core 14 having a plurality of winding-receiving rotor-slots 15. The rotor member also comprises a conductor-ventilated direct-current rotor-winding 16, which serves as a field-winding for the turbine-generator. This field-winding 16 has a very much lower voltage than the stator-winding 12, so that the field-winding conductors are provided with only a relatively light or low-voltage insulation. The lightly insulated rotor field-winding 16 is directly cooled by circulated hydrogen, in any desirable manner, as indicated by the arrows in Fig. 1.

In the machine which has been chosen for illustration in Fig. 1, the high-pressure hydrogen is used to cool both the stator and rotor-windings 12 and 16, this hydrogen being circulated in any desirable manner, as indicated by the arrows, and being cooled by one or more coolers 17 in any suitable manner. The particular cooling-system which is illustrated in Fig. 1 is that which is set forth in a companion application of R. A. Baudry, Serial No. 389,349, filed October 30, 1953. This is shown merely by way of illustration of a suitable ventilating-system.

As shown in Fig. 2, my improved stator-winding 12 comprises a plurality of half-coil portions, each comprising a conductor-assembly comprising a plurality of stacks of transposed, lightly insulated conductor-strands 20, surrounded by a protective layer of stacked, rectangular cross-sectioned, open-ended ventilating-ducts 21, which are disposed close against the four sides of the conductor-assembly, and a solid, continuous, major-insulation sheathing 22, with dielectric-barrier properties, closely surrounding the four sides of the protective layer of ventilating-ducts 21. Each of the strands 20 is individually protected by a thin, low-voltage layer of insulation 23, which may have a thickness of 6 or 7 mils, more or less, and which may be able to withstand 600 volts, more or less. The ducts 21 may be of either insulating or conductor material, provided that they have adequate mechanical strength to withstand the compression-forces necessary to consolidate the sheathing 22 in the process of manufacture. Preferably, and as illustrated, the ducts 21 are made of metal, in which case they are preferably of a high-resistance metal, and are lightly insulated with individual thin low-voltage insulating-coverings 24 surrounding the individual ducts, in which case each duct-insulation 24 may be 6 or 7 mils in thickness and may have a voltage-strength of 600 volts, more or less.

The sheathing 22 is commonly, and advantageously, made of Class B insulation, having a maximum temperature-rating of 130° C. According to my invention, the strand-insulation 23 is Class H insulation, having a maximum rating of 180° or 200° C., or it may be any other insulation having a higher temperature-rating than the sheathing 22. If the ducts 21 are provided with duct-insulation 24 as shown, this duct-insulation may also be of the less expensive Class B type of insulation, or other suitable insulation having a lower temperature-rating than the strand-insulation 23.

As pointed out at the outset of this specification, the result of my placement of the cooling-ducts 21, as a buffer-layer interposed between the stacked conductor-strands 20 and the sheathing 22, is that I can operate the stator-winding 12 at a considerably increased current-rating, as compared to the rating of the previous machines which had a single stack of cooling-ducts disposed in the center, between two stranded-conductor assemblies. The reason for this is that the previous construction placed the outer surfaces of the strand-assembly practically against the sheathing 22, being separated from the sheathing only by the very thin strand-insulation, which caused the inner surface of the sheathing to be substantially at the same temperature as the stranded conductor.

In my present improved construction, the inner surface of the sheathing 22 is at substantially the same temperature as the fluid-cooled ducts 21, so that the highest permissible sheathing-temperature is only a limitation on the duct-temperature and is not a limitation on the strand-temperature. It is a feature of my present invention, therefore, that the strands 20 are permitted to operate at a hot-point temperature which is considerably higher than the maximum duct-temperature, this maximum duct-temperature being substantially the same as the maximum temperature of the hydrogen (or other ventilating-fluid) which flows through the ducts 21. Since the rate at which the resistance-losses of the winding-conductors can be carried away by the ventilating fluid is dependent upon the temperature-differential between the fluid and the conductors, my increased hot-point conductor-temperature makes possible a substantial increase in the current-rating of the stator-winding 12, notwithstanding the fact that, for a given slot-area, the effective conductor-cross-section must be reduced to make room for the increased duct-area which is entailed by having the ducts 21 completely surround the conductor-strand assembly 20.

While I have illustrated my invention in but a single illustrative form or embodiment, I wish it to be understood that my invention is susceptible of use in other forms, and I do not desire to be strictly limited to the particular form which is illustrated.

I claim as my invention:

1. A dynamo-electric machine having a cylindrical-current stator-winding; said stator-winding having a plurality of half-coil portions, each comprising a conductor-assembly comprising a plurality of stacks of transposed, lightly insulated conductor-strands, a surrounding layer of stacked open-ended ventilating-ducts, close against the four sides of the conductor-assembly, and a major-insulation sheathing, with dielectric-barrier properties, close against the four sides of the ventilating-ducts; the strand-insulation being of a higher temperature-rating than the sheathing.

2. A dynamo-electric machine having a cylindrical-bore stator-member having an alternating-current stator-winding; said stator-winding having a plurality of half-coil portions, each comprising a conductor-assembly comprising a plurality of stacks of transposed, lightly insulated conductor-strands, a surrounding layer of stacked high-resistance, lightly insulated open-ended ventilating-ducts, close against the four sides of the conductor-assembly, and a major-insulation sheathing, with dielectric-barrier properties, close against the four sides of the ventilating-ducts; the strand-insulation being of a higher temperature-rating than the duct-insulation and the sheathing.

3. A large high-voltage high-speed alternating-current generator, having a cylindrical-bore stator-member having a conductor-ventilated high-voltage alternating-current stator-winding, a cylindrical rotor-member having a conductor-ventilated direct-current rotor-winding, and a gas-filled, hermetically sealed housing enclosing said stator and rotor-members; said stator-winding having a plurality of half-coil portions, each comprising a conductor-assembly comprising a plurality of stacks of transposed, lightly insulated conductor-strands, a surrounding layer of stacked open-ended ventilating ducts, close against the four sides of the conductor-assembly, and a major-insulation sheathing, with dielectric-barrier properties, close against the four sides of the ventilating-ducts; the strand-insulation being of a higher temperature-rating than the sheathing.

4. A large high-voltage high-speed alternating-current generator, having a cylindrical-bore stator-member having a conductor-ventilated high-voltage alternating-current stator-winding, a cylindrical rotor-member having a conductor-ventilated direct-current rotor-winding, and a gas-filled, hermetically sealed housing enclosing said stator and rotor-members; said stator-winding having a plurality of half-coil portions, each comprising a conductor-assembly comprising a plurality of stacks of transposed, lightly insulated conductor-strands, a surrounding layer of stacked high-resistance, lightly insulated open-ended ventilating-ducts, close against the four sides of the conductor-assembly, and a major-insulation sheathing, with dielectric-barrier properties, close against the four sides of the ventilating-ducts; the strand-insulation being of a higher temperature-rating than the duct-insulation and the sheathing.

References Cited in the file of this patent
UNITED STATES PATENTS

| | | |
|---|---|---|
| 2,573,670 | Moses | Oct. 30, 1951 |
| 2,664,512 | Huntley | Dec. 29, 1953 |